(12) United States Patent
Kaiser et al.

(10) Patent No.: US 12,155,142 B2
(45) Date of Patent: Nov. 26, 2024

(54) SAMARIUM-SILVER ALLOY CLAD STRUCTURE FOR CHARGING TERMINALS AND MANUFACTURING METHOD THEREOF

(71) Applicant: MATERION CORPORATION, Mayfield Heights, OH (US)

(72) Inventors: Joseph G. Kaiser, Mayfield Heights, OH (US); Alejandro J. Lluberes, Mayfield Heights, OH (US)

(73) Assignee: Materion Corporation, Mayfield Heights, OH (US)

( * ) Notice: Subject to any disclaimer, the term of this patent is extended or adjusted under 35 U.S.C. 154(b) by 0 days.

(21) Appl. No.: 17/794,424

(22) PCT Filed: Jan. 27, 2021

(86) PCT No.: PCT/US2021/015159
§ 371 (c)(1),
(2) Date: Jul. 21, 2022

(87) PCT Pub. No.: WO2021/154771
PCT Pub. Date: Aug. 5, 2021

(65) Prior Publication Data
US 2023/0187866 A1   Jun. 15, 2023

Related U.S. Application Data

(60) Provisional application No. 62/966,821, filed on Jan. 28, 2020.

(51) Int. Cl.
*H01R 13/03* (2006.01)
*B32B 7/025* (2019.01)
(Continued)

(52) U.S. Cl.
CPC ............. *H01R 13/03* (2013.01); *B32B 7/025* (2019.01); *B32B 15/018* (2013.01); *C22C 5/08* (2013.01);
(Continued)

(58) Field of Classification Search
None
See application file for complete search history.

(56) References Cited

U.S. PATENT DOCUMENTS

| | | | |
|---|---|---|---|
| 2008/0102307 A1 | 5/2008 | Zidar | |
| 2018/0223394 A1* | 8/2018 | Asada | ..................... H01R 43/12 |
| 2019/0139721 A1 | 5/2019 | Niitsuma et al. | |

FOREIGN PATENT DOCUMENTS

| | | | |
|---|---|---|---|
| CN | 1644725 A | * | 7/2005 |
| CN | 102304640 A | * | 1/2012 |

(Continued)

OTHER PUBLICATIONS

Enserve, "Copper Alloys", <https://www.enservejpn.com/products/copper-alloys/>, accessed Jan. 10, 2024.*
(Continued)

*Primary Examiner* — Xiaobei Wang
(74) *Attorney, Agent, or Firm* — COZEN O'CONNOR

(57) ABSTRACT

A layered structure for forming charging terminals for high power applications. In some embodiments, the layered structure may include a substrate and a contact layer disposed over at least a portion of the substrate. The substrate may have a conductivity greater than 40% International Annealed Copper Standard (IACS). The contact layer may demonstrate a coefficient of friction of less than 1.4, such as from 0.1 to 1.4, as measured in accordance with American Society of Testing and Materials (ASTM) G99-17. The contact layer may include a precious-metal-based alloy, such as a silver-samarium alloy.

13 Claims, 9 Drawing Sheets

(51) Int. Cl.
    *B32B 15/01*     (2006.01)
    *C22C 5/08*     (2006.01)
    *H01B 1/02*     (2006.01)
    *H01H 1/023*     (2006.01)
    *H01H 11/04*     (2006.01)
    *H01R 43/16*     (2006.01)

(52) U.S. Cl.
    CPC ............. *H01B 1/02* (2013.01); *H01H 11/041* (2013.01); *H01R 43/16* (2013.01); *B32B 2457/00* (2013.01); *H01H 1/023* (2013.01); *Y10T 428/12896* (2015.01); *Y10T 428/12903* (2015.01)

(56) References Cited

FOREIGN PATENT DOCUMENTS

| | | | |
|---|---|---|---|
| CN | 105648261 A | | 6/2016 |
| EP | 2902533 A1 | | 8/2015 |
| JP | H07-228931 A | * | 8/1995 |
| JP | 2012219349 A | * | 11/2012 |
| JP | 2015137417 A | | 7/2015 |

OTHER PUBLICATIONS

English translation of CN 105648261, EPO, accessed Jan. 10, 2024.*
International Application No. PCT/US2021/015159, International Search Report mailed Mar. 19, 2021, 3 pages.
"Friction Calculations", Materion Brush Performance Alloys, Technical Tidbits, Issue No. 74, Feb. 28, 2015, pp. 1-2.

* cited by examiner

SAMARIUM-SILVER ALLOY CLAD STRUCTURE FOR CHARGING TERMINALS AND MANUFACTURING METHOD THEREOF

CROSS-REFERENCE TO RELATED APPLICATION

This application is a national stage application of PCT/US2021/015159 filed on Jan. 27, 2021, which claims priority to U.S. Provisional Patent Application No. 62/966,821, filed Jan. 28, 2020, the entirety of which is incorporated herein by reference.

FIELD

The present disclosure relates to materials and structures having low coefficients of friction, low electrical resistance, and high wear/abrasion resistance. In particular, the disclosure relates to structures used as charging terminals for high power applications that demonstrate enhance performance characteristics.

BACKGROUND

Products that are powered by electric batteries require charging. Effective charging, especially with respect to high power products, requires ever-increasing current/voltage loads, which in turn require improvements in electrical conductivity and minimization of resistive losses in the charging terminals. Higher charging rates and resulting shorter charging times could increase current levels from traditional 10 A to 30 A up to 500 A and even 1,000 A in future fast charging systems.

Often times, typical electrical terminals comprise a conductive substrate and a contact layer. The conductive substrate provides for the transfer of electricity, while the contact layer, e.g., silver metal, lowers the surface contact resistance when the electricity transfers from the plug end of a charging terminal and is received in the receptacle end of the charging. However, these coated terminals often suffer from problems relating to coefficient of friction, durability, and/insertion force. In some applications, e.g., electric vehicle terminals, the market requires that charging cycles be extended to many thousands of insertions/withdrawals cycles. This creates a unique challenge when coupled with the physical limitations of an acceptable insertion force when a plug end of the charging terminal is inserted into the receptacle end. This is further complicated as the surface of the charging terminal wears over time, which degrades electrical contact properties of the charging terminal.

Conventional charging terminal materials produced using conventional processes, such as a copper substrate with an electroplated (pure) silver contact layer, have been found to be unable to produce charging terminal contacts that meet these ever-increasing requirements.

Even in view of the known products, the need remains for effective structures, e.g., charging terminals, that demonstrate improved electrical conductivity and low resistance while showing improvements in coefficient of friction, durability, and/or insertion force.

SUMMARY

In some embodiments, the disclosure relates to a layered structure comprising a substrate having a conductivity greater than 40% International Annealed Copper Standard (IACS) (or greater than $3.4801 \times 10^7$ S/m), e.g., greater than 60, and a contact layer disposed over at least a portion of the substrate. The contact layer demonstrates a coefficient of friction of less than 1.4. The coefficient of friction is measured in accordance with American Society for Testing and Materials (ASTM) G99-17. In some embodiments, the contact layer comprises a rare earth metal. In some embodiments, the contact layer comprises samarium. In some embodiments, the contact layer comprises a precious-metal-based alloy. In some embodiments, the contact layer comprises a silver alloy. In some embodiments, the contact layer comprises a samarium-silver alloy. In some embodiments, the contact layer comprises a samarium oxide. In some embodiments, the contact layer comprises less than 0.1 wt % samarium oxide. In some embodiments, the contact layer comprises less than 0.2 vol % samarium oxide. In some embodiments, the contact layer comprises a samarium oxide that is distributed across a depth of the contact layer ranging from 0.001 µm to 50 µm, as measured from the surface of the contact layer. In some embodiments, the contact layer comprises copper, nickel, or zinc, or combinations thereof. In some embodiments, the contact layer comprises: from 0.001 wt % to 10 wt % samarium; and/or from 50 wt % to 99.9 wt % silver. In some embodiments, the contact layer comprises: from 0.001 wt % to 10 wt % samarium; and/or balance silver. In some embodiments, the contact layer comprises: from 50 wt % to 99.9 wt % silver; from 0.1 wt % to 20 wt % nickel; from 1 wt % to 30 wt % copper; and from 0.001 wt % to 10 wt % zinc. In some embodiments, the substrate comprises a metal, preferably copper or copper alloy.

In some embodiments, the contact layer demonstrates a coefficient of friction ranging from 0.1 to 1.4. In some embodiments, the contact layer demonstrates a conductivity greater than 80% IACS (or greater than $4.6401 \times 10^7$ S/m). In some embodiments, the contact layer demonstrates a conductivity greater than 86% IACS (or greater than $4.9881 \times 10^7$ S/m). In some embodiments, the contact layer demonstrates a hardness of greater than 80 HV, as measured by ASTM E384-17. In some embodiments, the contact layer demonstrates a hardness ranging from 25 HV to 100 HV. In some embodiments, the contact layer demonstrates a hardness ranging from 150 HV to 200 HV. In some embodiments, the substrate demonstrates a conductivity greater than 95% IACS (or greater than $5.5101 \times 10^7$ S/m). In some embodiments, the substrate demonstrates a yield strength less than 70 ksi, as measured by ASTM E8/E8M-16a. In some embodiments, the layered structure demonstrates a conductivity greater than 80% IACS (or greater than $4.6401 \times 10^7$ S/m).

In some embodiments, the contact layer has a thickness ranging from 5 µm to 40 µm. In some embodiments, the layered structure has a thickness ranging from 0.1 mm to 5 mm. In some embodiments, the layered structure is formed by cladding the contact layer onto the substrate. In some embodiments, the layered structure further comprises a diffusion barrier disposed between the substrate and the contact layer. In some embodiments, the diffusion barrier comprises nickel or niobium. In some embodiments, the diffusion barrier has a thickness ranging from 0.01 mm to 0.05 mm. In some embodiments, the layered structure further comprises a backing layer disposed over at least a portion of the substrate opposite the contact layer. In some embodiments, the backing layer comprises a high strength copper based alloy or iron based alloy. In some embodiments, the backing layer comprises steel. In some embodiments, the backing layer has a thickness ranging from 0.1 mm to 1 mm. In some embodiments, the substrate and/or the contact layer are substantially flat. In some embodiments, the substrate is cylindrical, and the contact layer is disposed around at least a portion of the exterior surface of the cylindrical substrate. In some embodiments, the layered structure is configured for high power applications.

In some embodiments, the disclosure relates to an electrical terminal or connector made of the layered structure. The electrical terminal or connector is configured to perform greater than 5,000 insertion and extraction cycles, without failure. In some embodiments, when the electrical terminal or connector performs at least 5,000 insertion and extraction cycles, an increase in the contact resistance is less than 30%, less than 15%, less than 10%, less than 5%, less than 3%, less than 2%, or less than 1%.

In some embodiments, the disclosure relates to a charging terminal, comprising: a substrate having a conductivity greater than 60% IACS (or greater than $3.4801 \times 10^7$ S/m); and a contact layer disposed over at least a portion of the substrate. The charging terminal demonstrates a coefficient of friction ranging from 0.1 to 1.4, as measured in accordance with ASTM G99-17.

In some embodiments, the disclosure relates to a contact layer composition, comprising: samarium; silver; nickel; copper; and/or zinc. The contact layer composition demonstrates a coefficient of friction ranging from 0.1 to 1.4, as measured in accordance with ASTM G99-17. In some embodiments, the contact layer composition comprises: from 0.001 wt % to 10 wt % samarium; and/or from 50 wt % to 99.9 wt % silver. In some embodiments, the contact layer composition comprises: from 50 wt % to 99.9 wt % silver; from 0.1 wt % to 20 wt % nickel; from 1 wt % to 30 wt % copper; and from 0.001 wt % to 10 wt % zinc. In some embodiments, the contact layer demonstrates a conductivity of greater than 86% IACS (or greater than $4.9881 \times 10^7$ S/m). In some embodiments, samarium is a samarium oxide.

In some embodiments, the disclosure relates to a process for preparing a layered structure described herein. The process comprises: providing the substrate; and forming the contact layer over the substrate. In some embodiments, forming the contact layer over the substrate comprises forming an alloy comprising samarium metal over the substrate. In some embodiments, forming the contact layer over the substrate further comprises oxidizing at least some of the samarium metal by exposing the contact layer to air. In some embodiments, the process further comprises forming a diffusion barrier, optionally comprising nickel or niobium, between the substrate and the contact layer. In some embodiments, the process further comprises forming a backing layer, optionally comprising a high strength copper or iron based alloy, between the substrate and the contact layer. In some embodiments, any of the contact layer, the diffusion barrier, and/or the backing layer are achieved via cladding.

BRIEF DESCRIPTION OF THE DRAWINGS

A further understanding of the nature and advantages of the disclosed technology may be realized by reference to the remaining portions of the specification and the drawings.

DETAILED DESCRIPTION

Overview

Figure 1:
FIG. 1 schematically illustrates an embodiment of a layered structure that may be used to form or produce a charging terminal or charging contact.
Figure 1:
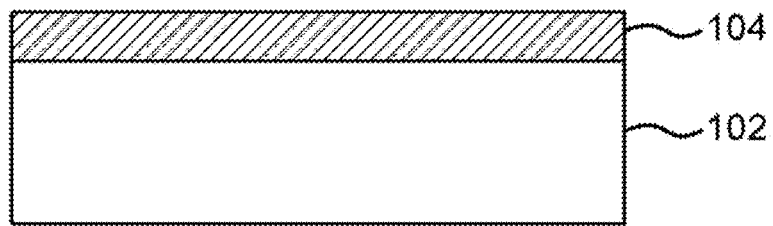

As discussed above, conventional charging terminal materials produced using conventional processes have failed to meet the increased mechanical and electrical performance requirements demanded by ever-evolving high power products, e.g., electric vehicles. In particular, the need exists for structures that demonstrate improved electrical conductivity and low resistance while showing improvements in coefficient of friction, durability, and/or insertion force.

The inventors have now found that certain rare earth metals, when added to a precious-metal-based contact layer for establishing and/or improving contact between electrical terminals, can serve to improve performance, e.g., coefficient of friction, hardness, and/or wear inter alia, of the electrical terminals. In some cases, the addition of certain rare earth metals, e.g., samarium, to contact layer materials, has been found to lower frictional forces during insertion and/or extraction of the charging terminal. These improvements have been shown without significantly affecting charging capability, e.g., conductivity. Typically, other alloying element additions, e.g., alloying elements other than rare earth metals, significantly compromise conductivity as they require greater weight percentage additions for effective hardening for improved wear performance. Without being bound by theory, it is believed that addition of rare earth metals, e.g., samarium, to certain precious-metal-based alloys, such as a silver alloy, creates lubricious surface oxide(s) on the alloy surface that lowers the coefficient of friction of the alloy while maintaining acceptable electrical conductivity. This unexpected result can be applied to meet the demanding requirements of electric vehicles charging where extremely high life cycles are required. For example, the charging terminal of electric vehicles may undergo many thousands of times of insertions and extractions. Given the low friction of coefficient provided by the contact layer described herein, the charging terminal may not incur significant loss of electrical performance, e.g., loss of efficient electrical contact (or low contact resistance) due to excessive wear throughout its entire operating life.

In some embodiments, the disclosure relates to a layered structure (for use in charging terminals). The layered structure may include a substrate and a precious-metal-based alloy with rare-earth-metal addition(s) that forms a contact layer over at least a portion of the substrate. In some embodiments, the rare earth metal contained in the contact layer may include any one of the lanthanides, scandium, or yttrium or combinations thereof. In some embodiments, the rare earth metal contained in the contact layer may include samarium. In some embodiments, the contact layer may include a precious-metal-based contact layer and may include silver. Thus, the contact layer may be referred to as a samarium-silver alloy. In some embodiments, the contact layer may further optionally include copper, nickel, or zinc, or combinations thereof. The addition of copper, nickel, and/or zinc may improve the hardness of the precious-metal-based alloy.

The composition of the contact layer provides for excellent surface characteristics, e.g., contact resistance, abrasion/wear performance, and/or coefficient of friction, as discussed herein. In particular, the contact layer surface characteristics have been found to unexpectedly lower insertion forces while improving wear and electrical resistive losses of the charging terminals, e.g., plug and/or receptacle charging contacts. Such performance is particularly beneficial in applications relating to electric vehicles (EVs) and/or plug-in hybrid electric vehicle (PHEV). The contact layer may be formed/applied via various methods, e.g., cladding, electroplating, etc. The layer is not limited by the manner in which it is formed.

Substrate Characteristics

The substrate has electrical (conductive) and mechanical properties, that synergistically cooperate with the contact layer to surprisingly improve the overall performance of the charging terminal, both electrically and mechanically. In some embodiments, the substrate may be made of a conductive material, such as metal or metal alloy, more specifically, such as copper or copper alloy, for conducting current through the charging terminal. In some embodiments, the substrate may have a relatively high conductivity as demanded by the rapid charging requirement for high power applications. In some embodiments, the substrate may have a conductivity greater than 40% International Annealed Copper Standard (IACS), e.g., greater than 60 IACS. The IACS is used herein as a comparative property for specifying the conductivity of the various materials described herein, and is not limited to conductivity of copper only. For example, the description may specify a material's conductivity to be 85% IACS, which means that that particular material's electrical conductivity is 85% of pure copper specified in the IACS. The conductivity of pure copper specified in the IACS, i.e., 100% IACS, is $5.8001 \times 10^7$ Siemens per meter (S/m). Thus, a conductivity of 85% IACS is 85%×$5.8001 \times 10^7$ S/m=$4.9301 \times 10^7$ S/m.

In lower power and/or low current carrying applications, the electrical conductivity of substrate metals are less functionally critical. Substrate selection based on conductivity is less important relative to mechanical stiffness and spring characteristics. Thus a wider range of substrate alloys with higher stiffness and spring properties but with corresponding lower conductivities can be appropriate and in fact desirable in these smaller profile, delicate connections. It is well known that elemental additions are employed to create copper alloys of higher strength. These additions, however, affect conductivity detrimentally and yield a substrate having lower conductivity, e.g., less than 60% IACS (or less than $3.4801 \times 10^7$ S/m). And modification of these lower conductivity substrates to improve conductivity would adversely affect the required springiness and render the resultant product unsuitable. In other words, a certain degree of springiness (as required in some low power and/or more delicate applications) conflicts with the ability to conduct electricity at higher power levels. Thus, materials suitable for low power applications may be limited to low power and appropriate only to these delicate, but more mechanically demanding, applications, In some cases, when the substrate is a copper-based substrate, to achieve high stiffness, high strength, and spring characteristics, materials suitable for forming the substrate may have relatively high weight percentages of alloying elements (e.g., non-copper elements) or relatively low copper content, e.g., less than 40% copper. This is because, relatively high copper content, e.g., over 40% copper, over 50% copper, over 60% copper, over 70% copper, over 80% copper, over 90% copper, over 95% copper, or close to 100% of copper, produces a relatively soft substrate. Adding alloying elements can increase hardness, stiffness, and/or strength, but can also significantly reduce the conductivity of the substrate. As noted above, when a material is modified to achieve springiness by adding alloying elements, such modification can also render the material unsuitable for high power application due to low conductivity, e.g., less than 60% IACS (or less than $3.4801 \times 10^7$ S/m).

In the various embodiments described herein, the substrate may have a conductivity ranging from 40% IACS ($2.3200 \times 10^7$ S/m) to 100% IACS ($5.8001 \times 10^7$ S/m), e.g., 45% IACS ($2.6100 \times 10^7$ S/m) to 100% IACS ($5.8001 \times 10^7$ S/m), 50% IACS ($2.9000 \times 10^7$ S/m) to 100% IACS ($5.8001 \times 10^7$ S/m), 55% IACS ($3.1900 \times 10^7$ S/m) to 100% IACS ($5.8001 \times 10^7$ S/m), from 60% IACS ($3.4801 \times 10^7$ S/m) to 100% IACS ($5.8001 \times 10^7$ S/m), from 65% IACS ($3.7701 \times 10^7$ S/m) to 100% IACS ($5.8001 \times 10^7$ S/m), from 70% IACS ($4.0601 \times 10^7$ S/m) to 100% IACS ($5.8001 \times 10^7$ S/m), from 75% IACS ($4.3501 \times 10^7$ S/m) to 100% IACS ($5.8001 \times 10^7$ S/m), from 80% IACS ($4.6401 \times 10^7$ S/m) to 100% IACS ($5.8001 \times 10^7$ S/m), from 85% IACS ($4.9301 \times 10^7$ S/m) to 100% IACS ($5.8001 \times 10^7$ S/m), from 90% IACS ($5.2201 \times 10^7$ S/m) to 100% IACS ($5.8001 \times 10^7$ S/m), or from 95% IACS ($5.5101 \times 10^7$ S/m) to 100% IACS ($5.8001 \times 10^7$ S/m). In terms of lower limits, the substrate may have a conductivity greater than 40% IACS ($2.3200 \times 10^7$ S/m), e.g., greater than 45% IACS ($2.6100 \times 10^7$ S/m), greater than 50% IACS ($2.9000 \times 10^7$ S/m), greater than 55% IACS ($3.1900 \times 10^7$ S/m), greater than 60% IACS ($3.4801 \times 10^7$ S/m), e.g., greater than 65% IACS ($3.7701 \times 10^7$ S/m), greater than 70% IACS ($4.0601 \times 10^7$ S/m), greater than 75% IACS ($4.3501 \times 10^7$ S/m), greater than 80% IACS ($4.6401 \times 10^7$ S/m), greater than 85% IACS ($4.9301 \times 10^7$ S/m), greater than 90% IACS ($5.2201 \times 10^7$ S/m), greater than 91% IACS ($5.2781 \times 10^7$ S/m), greater than 92% IACS ($5.3361 \times 10^7$ S/m), greater than 93% IACS ($5.3941 \times 10^7$ S/m), greater than 94% IACS ($5.4521 \times 10^7$ S/m), greater than 95% IACS ($5.5101 \times 10^7$ S/m), greater than 96% IACS ($5.5681 \times 10^7$ S/m), greater than 97% IACS ($5.6261 \times 10^7$ S/m), greater than 98% IACS ($5.6841 \times 10^7$ S/m), greater than 99% IACS ($5.7421 \times 10^7$ S/m), or greater.

In some embodiments, the substrate described herein demonstrates a yield strength ranging from 5 ksi to 70 ksi, as measured in accordance with ASTM E8/E8M-16a, e.g., from 6 ksi to 70 ksi, from 8 ksi to 70 ksi, from 10 ksi to 60 ksi, from 20 ksi to 50 ksi, or from 30 ksi to 40 ksi. In terms of lower limits, the substrate may demonstrate a yield strength greater than 5 ksi, e.g., greater than 6 ksi, greater than 8 ksi, greater than 10 ksi, greater than 20 ksi, greater than 30 ksi, greater than 40 ksi, greater than 50 ksi, greater than 60 ksi, or greater than 65 ksi. In terms of upper limits, the substrate may demonstrate a yield strength less than 70 ksi, e.g., less than 60 ksi, less than 50 ksi, less than 40 ksi, less than 30 ksi, less than 20 ksi, less than 10 ksi, less than 8 ksi, or less than 6 ksi.

In contrast, for applications, in particular, relatively low-power applications, that demand a higher strength at the expense of lower conductivity (e.g., lower than 60% IACS ($3.4801 \times 10^7$ S/m)), the copper-based substrate for those applications may demonstrate a yield strength greater than 70 ksi, and may demonstrate a yield strength ranging from 70 ksi to 120 ksi.

Effects of Rare Earth Metal Addition

As discussed above, the addition of the rare earth metal allows the contact layer to achieve very low coefficient of friction, thereby reducing the insertion force of the charging terminal produced. Without being bound by theory, it is believed that the low coefficient of friction may be a result of one or more lubricious oxides that may develop from one or more of the metals contained in the contact layer. In some embodiments, the oxides may include an oxide developed from the rare earth metal contained in the contact layer when the contact layer is exposed to air. In some embodiments, the one or more developed oxides may include a samarium oxide. In some embodiments, the one or more developed oxides may further include samarium(III) oxide. In some embodiments, other metals contained in the contact layer, e.g., silver, nickel, copper, zinc, etc., may also form one or more oxides on the surface of the substrate. The unique and unexpected nature of the rare earth metal oxide, such as samarium oxide, is believed to impart a low friction effect to the surface of the silver alloy matrix.

It is believed that the oxide may form a surface layer of the contact layer or may be present only at the surface of contact layer, while the metal or metals below the surface may remain elemental metal(s) until exposed to air due to wear/erosion, etc., and then oxidized. Thus, throughout the operating life of the charging terminal, the contact layer may demonstrate excellent electric conductivity as the composition of the contact layer remain mostly element metals, while the exposed surface of the contact layer may demonstrate very low coefficient of friction due to the oxide developed, allowing for ease of insertion and/or extraction of the charging terminal.

Compositional wt %

In some embodiments, the rare earth metal, such as samarium, may be present in the contact layer in an amount (significantly) less than that of the precious metal, e.g., silver. In some embodiments, the contact layer may include from 0.001 wt % to 10 wt % rare earth metal, based on the total weight of the contact layer, e.g., from 0.1 wt % to 9 wt %, from 1 wt % to 8 wt %, from 2 wt % to 7 wt %, from 3 wt % to 6 wt %, or from 4 wt % to 5 wt %. In terms of lower limits, the contact layer may include greater than 0.001 wt % rare earth metal, e.g., greater than 0.005 wt %, greater than 0.01 wt %, greater than 0.05 wt %, greater than 0.1 wt %, greater than 0.5 wt %, greater than 1 wt %, greater than 2 wt %, greater than 3 wt %, greater than 4 wt %, greater than 5 wt %, greater than 6 wt %, greater than 7 wt %, greater than 8 wt %, greater than 9 wt %, greater than 9.5 wt %, greater than 9.9 wt %, or greater. In terms of upper limits, the contact layer may comprise less than 10 wt % rare earth metal, e.g., less than 9 wt %, less than 8 wt %, less than 7 wt %, less than 6 wt %, less than 5 wt %, less than 4 wt %, less than 3 wt %, less than 2 wt %, less than 1 wt %, less than 0.5 wt %, less than 0.1 wt %, less than 0.05 wt %, less than 0.01 wt %, less than 0.005 wt %, or less. In some cases, the rare earth metal comprises samarium and the samarium is present in the aforementioned amounts. In some embodiments, the remainder or balance of the contact layer may be the precious metal, such as silver.

In some embodiments, the contact layer may include from 50 wt % to 99.9 wt % precious metal, e.g., silver, based on the total weight of the contact layer, e.g., from 50 wt % to 99 wt %, from 55 wt % to 95 wt %, from 60 wt % to 90 wt %, from 65 wt % to 85 wt %, or from 70 wt % to 80 wt %. In terms of lower limits, the contact layer may include greater than 50 wt % precious metal, e.g., greater than 55 wt %, greater than 60 wt %, greater than 65 wt %, greater than 70 wt %, greater than 75 wt %, greater than 80 wt %, greater than 85 wt %, greater than 90 wt %, greater than 95 wt %, greater than 98 wt %, greater than 99 wt %, greater than 99.5 wt %, or greater. In terms of upper limits, the contact layer may comprise less than 99.9 wt % precious metal, e.g., less than 99 wt %, less than 95 wt %, less than 90 wt %, less than 85 wt %, less than 80 wt %, less than 75 wt %, less than 70 wt %, less than 65 wt %, less than 60 wt %, less than 55 wt %, less than 52 wt %, or less. In some cases, the precious metal comprises silver and the silver is present in the aforementioned amounts.

In some embodiments, the contact layer may include from 0.1 wt % to 20 wt % nickel, based on the total weight of the contact layer, e.g., from 0.3 wt % to 20 wt %, from 0.5 wt % to 20 wt %, from 1 wt % to 20 wt %, from 3 wt % to 18 wt %, from 5 wt % to 16 wt %, from 7 wt % to 14 wt %, from 9 wt % to 12 wt %, or from 10 wt % to 11 wt %. In terms of lower limits, the contact layer may include greater than 0.1 wt % nickel, e.g., greater than 0.3 wt %, greater than 0.5 wt %, greater than 1 wt %, greater than 2 wt %, greater than 3 wt %, greater than 4 wt %, greater than 5 wt %, greater than 6 wt %, greater than 7 wt %, greater than 8 wt %, greater than 9 wt %, greater than 10 wt %, greater than 11 wt %, greater than 12 wt %, greater than 13 wt %, greater than 14 wt %, greater than 15 wt %, greater than 16 wt %, greater than 17 wt %, greater than 18 wt %, greater than 19 wt %, greater than 19.5 wt %, greater than 19.9 wt %, or greater. In terms of upper limits, the contact layer may comprise less than 20 wt % nickel, e.g., less than 19 wt %, less than 18 wt %, less than 17 wt %, less than 16 wt %, less than 15 wt %, less than 14 wt %, less than 13 wt %, less than 12 wt %, less than 11 wt %, less than 10 wt %, less than 9 wt %, less than 8 wt %, less than 7 wt %, less than 6 wt %, less than 5 wt %, less than 4 wt %, less than 3 wt %, less than 2 wt %, less than 1.5 wt %, less than 1.1 wt %, less than 1 wt %, less than 0.8 wt %, less than 0.6 wt %, less than 0.5 wt %, less than 0.3 wt %, less than 0.2 wt %, less than 0.15 wt %, or less.

In some embodiments, the contact layer may include from 1 wt % to 30 wt % copper, based on the total weight of the contact layer, e.g., from 2 wt % to 30 wt %, from 2 wt % to 28 wt %, from 2 wt % to 26 wt %, from 2 wt % to 24 wt %, from 3 wt % to 22 wt %, from 3 wt % to 20 wt %, from 3 wt % to 18 wt %, from 5 wt % to 16 wt %, from 7 wt % to 14 wt %, from 9 wt % to 12 wt %, or from 10 wt % to 11 wt %. In terms of lower limits, the contact layer may include greater than 1 wt % copper, e.g., greater than 2 wt %, greater than 3 wt %, greater than 4 wt %, greater than 5 wt %, greater than 6 wt %, greater than 7 wt %, greater than 8 wt %, greater than 9 wt %, greater than 10 wt %, greater than 11 wt %, greater than 12 wt %, greater than 13 wt %, greater than 14 wt %, greater than 15 wt %, greater than 16 wt %, greater than 17 wt %, greater than 18 wt %, greater than 19 wt %, greater than 19.5 wt %, greater than 19.9 wt %, greater than 20 wt %, greater than 21 wt %, greater than 22 wt %, greater than 23 wt %, greater than 24 wt %, greater than 25 wt %, greater than 26 wt %, greater than 27 wt %, greater than 28 wt %, 29 wt %, greater than 29.5 wt %, greater than 29.9 wt %, or greater. In terms of upper limits, the contact layer may comprise less than 30 wt % copper, e.g., less than 29 wt %, less than 28 wt %, less than 27 wt %, less than 26 wt %, less than 25 wt %, less than 24 wt %, less than 23 wt %, less than 22 wt %, less than 21 wt %, less than 20 wt %, less than 19 wt %, less than 18 wt %, less than 17 wt %, less than 16 wt %, less than 15 wt %, less than 14 wt %, less than 13 wt %, less than 12 wt %, less than 11 wt %, less than 10 wt %, less than 9 wt %, less than 8 wt %, less than 7 wt %, less than 6 wt %, less than 5 wt %, less than 4 wt %, less than 3 wt %, less than 2 wt %, less than 1.5 wt %, less than 1.1 wt %, or less.

In some embodiments, the contact layer may include from 0.001 wt % to 10 wt % zinc, based on the total weight of the contact layer, e.g., from 0.1 wt % to 9 wt %, from 1 wt % to 8 wt %, from 2 wt % to 7 wt %, from 3 wt % to 6 wt %, or from 4 wt % to 5 wt %. In terms of lower limits, the contact layer may include greater than 0.001 wt % zinc, e.g., greater than 0.005 wt %, greater than 0.01 wt %, greater than 0.05 wt %, greater than 0.1 wt %, greater than 0.5 wt %, greater than 1 wt %, greater than 2 wt %, greater than 3 wt %, greater than 4 wt %, greater than 5 wt %, greater than 6 wt %, greater than 7 wt %, greater than 8 wt %, greater than 9 wt %, greater than 9.5 wt %, greater than 9.9 wt %, or greater. In terms of upper limits, the contact layer may comprise less than 10 wt % zinc, e.g., less than 9 wt %, less than 8 wt %, less than 7 wt %, less than 6 wt %, less than 5 wt %, less than 4 wt %, less than 3 wt %, less than 2 wt %, less than 1 wt %, less than 0.5 wt %, less than 0.1 wt %, less than 0.05 wt %, less than 0.01 wt %, less than 0.005 wt %, or less.

In some embodiments, as the contact layer is exposed to air, the oxide that may develop at the surface of the contact layer, e.g., samarium oxide, may range from 0.01 wt % to 0.1 wt %, based on the total weight of the contact layer, e.g., from 0.02 wt % to 0.1 wt %, from 0.02 wt % to 0.09 wt %, from 0.03 wt % to 0.09 wt %, from 0.03 wt % to 0.08 wt %, from 0.04 wt % to 0.07 wt %, or from 0.04 wt % to 0.06 wt %. In terms of lower limits, the contact layer may include greater than 0.01 wt % surface oxide, e.g., greater than 0.02 wt %, greater than 0.03 wt %, greater than 0.04 wt %, greater than 0.05 wt %, greater than 0.06 wt %, greater than 0.07 wt %, greater than 0.08 wt %, greater than 0.09 wt %, greater than 0.095 wt %, or greater. In terms of upper limits, the contact layer may include less than 0.1 wt % surface oxide, e.g., less than 0.09 wt %, less than 0.08 wt %, less than 0.07 wt %, less than 0.06 wt %, less than 0.05 wt %, less than 0.04 wt %, less than 0.03 wt %, less than 0.02 wt %, less than 0.015 wt %, or less.

When measured based on the total volume of the contact layer, the contact layer may include from 0.01 vol % to 0.2 vol % oxide, e.g., from 0.02 vol % to 0.2 vol %, from 0.02 vol % to 0.18 vol %, from 0.04 vol % to 0.18 vol %, from 0.04 vol % to 0.16 vol %, from 0.06 vol % to 0.14 vol %, from 0.08 vol % to 0.12 vol %, or from 0.09 vol % to 0.11 vol %. In terms of lower limits, the contact layer may include greater than 0.01 vol % surface oxide, e.g., greater than 0.02 vol %, greater than 0.04 vol %, greater than 0.06 vol %, greater than 0.08 vol %, greater than 0.1 vol %, greater than 0.12 vol %, greater than 0.14 vol %, greater than 0.16 vol %, greater than 0.18 vol %, greater than 0.19 vol %, or greater. In terms of upper limits, the contact layer may include less than 0.2 vol % surface oxide, e.g., less than 0.18 vol %, less than 0.16 vol %, less than 0.14 vol %, less than 0.12 vol %, less than 0.1 vol %, less than 0.08 vol %, less than 0.06 vol %, less than 0.04 vol %, less than 0.02 vol %, less than 0.015 vol %, or less.

In some embodiments, the substrate may include pure copper. In some embodiments, the substrate may include an copper alloy. The copper alloy may include copper, nickel, and/or zinc. In some embodiments, the substrate may include from 60 wt % to 100 wt % copper, based on the total weight of the substrate, e.g., from 70 wt % to 100 wt %, from 80 wt % to 100 wt %, from 90 wt % to 100 wt %, or from 95 wt % to 100 wt %. In terms of lower limits, the substrate may include greater than 60 wt % copper, e.g., greater than 70 wt %, greater than 80 wt %, greater than 90 wt %, greater than 91 wt %, greater than 92 wt %, greater than 93 wt %, greater than 94 wt %, greater than 95 wt %, greater than 96 wt %, greater than 97 wt %, greater than 98 wt %, greater than 99 wt %, or 100 wt %. As noted above, many conventional low power applications employ significantly less pure substrate, e.g., less pure copper.

The addition of other elements, e.g., nickel, zinc, etc., to the substrate may be limited such that a relatively high copper content may be maintained to achieve a high conductivity. The addition of other elements combined may be less than 40 wt %, less than 30 wt %, less than 20 wt %, less than 10 wt %, less than 5 wt %, less than 4 wt %, less than 3 wt %, less than 2 wt %, less than 1 wt %, less than 0.9 wt %, less than 0.8 wt %, less than 0.7 wt %, less than 0.6 wt %, less than 0.5 wt %, less than 0.4 wt %, less than 0.3 wt %, less than 0.2 wt %, less than 0.1 wt %, or less.

Contact Layer Performance Features

Coefficient of Friction

As compared to conventional (pure and/or electroplated) silver contact layer that may be electroplated on the substrate, the precious-metal-based contact layer with rare-earth-metal addition(s) may demonstrate a coefficient of friction that may be at least 20% less than the coefficient of friction of the conventional, electroplated silver contact layer, e.g., 30% less, 40% less, 50% less, 60% less, 70% less, 80% less, 90% less, or 95% less. In some embodiments, the precious-metal-based contact layer may demonstrate a coefficient of friction ranging from 0.01 to 1.4, measured in accordance with ASTM G99-17, e.g., from 0.01 to 1.4, from 0.05 to 1.4, from 0.2 to 1.4, from 0.2 to 1.2, from 0.2 to 1, from 0.3 to 0.9, from 0.3 to 0.8, from 0.3 to 0.7, or from 0.4 to 0.6. In terms of upper limits, the coefficient of friction of the precious-metal-based contact layer may be less than 1.4, e.g., less than 1.3, less than 1.2, less than 1.1, less than 1, less than 0.9, less than 0.8, less than 0.7, less than 0.6, less than 0.5, less than 0.4, less than 0.3, less than 0.2, or less than 0.15. Depending on the specific geometric design, measuring the coefficient of friction can also be done using one of following tests, including ASTM D3702, ASTM G77, ASTM G83, ASTM G115, and/or ASTM G133.

Hardness

The precious-metal-based contact layer may also demonstrate improved hardness over conventional, electroplated silver contact layer, and thus may allow for improved wear/erosion resistance. The hardness of the contact layer may be evaluated using the Vickers hardness scale, and the measured hardness value may be expressed in Vickers number (HV). The test employed for measuring the hardness of the contact layer may include ASTM E384-17. In some embodiments, the precious-metal-based contact layer may demonstrate a hardness ranging from 25 HV to 200 HV, in according with the Vickers hardness scale, e.g., from 25 HV to 175 HV, from 25 HV to 150 HV, from 25 HV to 125 HV, from 25 HV to 100 HV, from 25 HV to 75 HV, from 25 HV to 50 HV, from 50 HV to 200 HV, from 50 HV to 175 HV, from 50 HV to 150 HV, from 50 HV to 125 HV, from 50 HV to 100 HV, from 50 HV to 75 HV, from 75 HV to 200 HV, from 75 HV to 175 HV, from 75 HV to 150 HV, from 75 HV to 125 HV, from 75 HV to 100 HV, from 100 HV to 200 HV, from 100 HV to 175 HV, from 100 HV to 150 HV, from 100 HV to 125 HV, from 100 HV to 120 HV, from 125 HV to 200 HV, from 125 HV to 175 HV, from 125 HV to 150 HV, from 150 HV to 200 HV, from 150 HV to 175 HV, or from 175 HV to 200 HV. In terms of lower limits, the precious-metal-based contact layer may demonstrate a hardness greater than 25 HV, e.g., greater than 50 HV, greater than 60 HV, greater than 70 HV, greater than 80 HV, greater than 90 HV, greater than 100 HV, greater than 125 HV, greater than 150 HV, greater than 175 HV, greater than 180 HV, greater than 190 HV, greater than 195 HV, or greater. In terms of upper limits, the precious-metal-based contact layer may demonstrate a hardness less than 200 HV, e.g., less than 175 HV, less than 150 HV, less than 125 HV, less than 100 HV, less than 90 HV, less than 80 HV, less than 70 HV, less than 60 HV, less than 50 HV, less than 40 HV, less than 30 HV, or less than.

Electrical

Despite the formation of surface oxides that provides for the lowered coefficient of friction and reduced insertion force required for operating the charging terminal, the precious-metal-based contact layer nonetheless advantageously demonstrates a relatively high conductivity, e.g., the contact layer demonstrates a synergistic combination of low coefficient of friction and high conductivity. In some embodiments, the precious-metal-based contact layer may demonstrate a conductivity ranging from 80% IACS ($4.6401 \times 10^7$ S/m) to 100% IACS ($5.8001 \times 10^7$ S/m), e.g., from 85% IACS ($4.9301 \times 10^7$ S/m) to 100% IACS ($5.8001 \times 10^7$ S/m), from 80% IACS ($4.6401 \times 10^7$ S/m) to 95% IACS ($5.5101 \times 10^7$ S/m), from 90% IACS ($5.2201 \times 10^7$ S/m) to 100% IACS ($5.8001 \times 10^7$ S/m), from 95% IACS ($5.5101 \times 10^7$ S/m) to 100% IACS ($5.8001 \times 10^7$ S/m), from 85% IACS ($4.9301 \times 10^7$ S/m) to 95% IACS ($5.5101 \times 10^7$ S/m), or from 90% IACS ($5.2201 \times 10^7$ S/m) to 95% IACS ($5.5101 \times 10^7$ S/m). In terms of lower limits, the precious-metal-based contact layer may demonstrate a conductivity of greater than 80% IACS ($4.6401 \times 10^7$ S/m), e.g., greater than 82% IACS ($4.7561 \times 10^7$ S/m), greater than 84% IACS ($4.8721 \times 10^7$ S/m), greater than 86% IACS ($4.9881 \times 10^7$ S/m), greater than 88% IACS ($5.1041 \times 10^7$ S/m), greater than 90% IACS ($5.2201 \times 10^7$ S/m), greater than 92% IACS ($5.3361 \times 10^7$ S/m), greater than 94% IACS ($5.4521 \times 10^7$ S/m), greater than 96% IACS ($5.5681 \times 10^7$ S/m), greater than 98% IACS ($5.6841 \times 10^7$ S/m), greater than 99% IACS ($5.7421 \times 10^7$ S/m), or 100% IACS ($5.8001 \times 10^7$ S/m).

In some embodiments, the overall conductivity of the layered structure may range from 80% ($4.6401 \times 10^7$ S/m) IACS to 100% IACS ($5.8001 \times 10^7$ S/m), e.g., from 85% IACS ($4.9301 \times 10^7$ S/m) to 100% IACS ($5.8001 \times 10^7$ S/m), from 80% IACS ($4.6401 \times 10^7$ S/m) to 95% IACS ($5.5101 \times 10^7$ S/m), or from 85% IACS ($4.9301 \times 10^7$ S/m) to 95% IACS ($5.5101 \times 10^7$ S/m). In terms of lower limits, the layered structure may demonstrate an overall conductivity of greater than 80% IACS ($4.6401 \times 10^7$ S/m), e.g., greater than 82% IACS ($4.7561 \times 10^7$ S/m), greater than 84% IACS ($4.8721 \times 10^7$ S/m), greater than 86% IACS ($4.9881 \times 10^7$ S/m), greater than 88% IACS ($5.1041 \times 10^7$ S/m), greater than 90% IACS ($5.2201 \times 10^7$ S/m), greater than 92% IACS ($5.3361 \times 10^7$ S/m), greater than 94% IACS ($5.4521 \times 10^7$ S/m), greater than 96% IACS ($5.5681 \times 10^7$ S/m), greater than 98% IACS ($5.6841 \times 10^7$ S/m), greater than 99% IACS ($5.7421 \times 10^7$ S/m), or greater.

Further, due to the lowered coefficient of friction and the improved wear/erosion performance, the precious-metal-based contact layer may maintain its electrical performance, e.g., high conductivity and low contact resistance, throughout the operating life of the charging terminal as a smooth contact surface may be maintained. Additionally, with the improved wear/erosion performance, a thinner contact layer, relative to the conventional, electroplated silver contact layer, may be implemented. The overall thickness of the charging terminal may be maintained by increasing the thickness of the substrate, if desired. Thus, the overall cost for producing the charging terminal may be lowered, while achieving excellent electrical performance.

Thickness

In some embodiments, the contact layer may have a thickness ranging from 2 μm to 100 μm, from 2 μm to 50 μm, from 3 μm to 40 μm, from 4 μm to 35 μm, from 5 μm to 40 μm, from 5 μm to 35 μm, from 10 μm to 30 μm, from 10 μm to 25 μm, or from 15 μm to 20 μm. In terms of upper limits, the contact layer may have a thickness less than 40 μm, e.g., less than 35 μm, less than 30 μm, less than 25 μm, less than 20 μm, less than 15 μm, less than 10 μm, less than 7 μm, or less. In terms of lower limits, the contact layer may have a thickness greater than 5 μm, e.g., greater than 10 μm, greater than 15 μm, greater than 20 μm, or greater.

As discussed above, oxide(s) may develop at the surface of the contact layer when certain metals, such as the rare earth metals contained in the contact layer, are exposed to air. Depending on the content of the oxide-forming metal and the environment the contact layer may be exposed to, the oxide(s), such as samarium oxide, may be distributed across a depth of the contact layer ranging from 0.001 μm to 50 μm, as measured from the surface of the contact layer, e.g., from 0.001 μm to 40 μm, from 0.001 μm to 30 μm, from 0.001 μm to 20 μm, from 0.001 μm to 10 μm, from 0.001 μm to 5 μm, from 0.001 μm to 3 μm, from 0.001 μm to 1 μm, from 0.001 μm to 0.5 μm, from 0.001 μm to 0.1 μm, from 0.001 μm to 0.05 μm, from 0.001 μm to 0.01 μm, from 0.001 μm to 0.005 μm, from 0.005 μm to 50 μm, from 0.005 μm to 40 μm, from 0.005 μm to 30 μm, from 0.005 μm to 20 μm, from 0.005 μm to 10 μm, from 0.005 μm to 5 μm, from 0.005 μm to 3 μm, from 0.005 μm to 1 μm, from 0.005 μm to 0.5 μm, from 0.005 μm to 0.1 μm, from 0.005 μm to 0.05 μm, from 0.005 μm to 0.01 μm, from 0.01 μm to 50 μm, from 0.01 μm to 40 μm, from 0.01 μm to 30 μm, from 0.01 μm to 20 μm, from 0.01 μm to 10 μm, from 0.01 μm to 5 μm, from 0.01 μm to 3 μm, from 0.01 μm to 1 μm, from 0.01 μm to 0.5 μm, from 0.01 μm to 0.1 μm, from 0.01 μm to 0.05 μm, from 0.05 μm to 50 μm, from 0.05 μm to 40 μm, from 0.05 μm to 30 μm, from 0.05 μm to 20 μm, from 0.05 μm to 10 μm, from 0.05 μm to 5 μm, from 0.05 μm to 3 μm, from 0.05 μm to 1 μm, from 0.05 μm to 0.5 μm, from 0.05 μm to 0.1 μm, from 0.1 μm to 50 μm, from 0.1 μm to 40 μm, from 0.1 μm to 30 μm, from 0.1 μm to 20 μm, from 0.1 μm to 10 μm, from 0.1 μm to 5 μm, from 0.1 μm to 3 μm, from 0.1 μm to 1 μm, from 0.1 μm to 0.5 μm, from 0.5 μm to 50 μm, from 0.5 μm to 40 μm, from 0.5 μm to 30 μm, from 0.5 μm to 20 μm, from 0.5 μm to 10 μm, from 0.5 μm to 5 μm, from 0.5 μm to 3 μm, from 0.5 μm to 1 μm, from 1 μm to 50 μm, from 1 μm to 40 μm, from 1 μm to 30 μm, from 1 μm to 20 μm, from 1 μm to 10 μm, from 1 μm to 5 μm, from 1 μm to 3 μm, from 3 μm to 50 μm, from 3 μm to 40 μm, from 3 μm to 30 μm, from 3 μm to 20 μm, from 3 μm to 10 μm, from 3 μm to 5 μm, from 5 μm to 50 μm, from 5 μm to 40 μm, from 5

μm to 30 μm, from 5 μm to 20 μm, from 5 μm to 10 μm, from 10 μm to 50 μm, from 10 μm to 40 μm, from 10 μm to 30 μm, from 10 μm to 20 μm, from 20 μm to 50 μm, from 20 μm to 40 μm, from 20 μm to 30 μm, from 30 μm to 50 μm, from 30 μm to 40 μm, or from 40 μm to 50 μm. In terms of lower limits, the oxide may be distributed from the surface of the contact layer across a depth of greater than 0.001 μm, e.g., greater than 0.005 μm, greater than 0.01 μm, greater than 0.05 μm, greater than 0.1 μm, greater than 0.5 μm, greater than 1 μm, greater than 3 μm, greater than 5 μm, greater than 10 μm, greater than 20 μm, greater than 30 μm, greater than 40 μm, greater than 45 μm, or greater. In terms of upper limits, the oxide may be distributed from the surface of the contact layer across a depth of less than 50 μm, e.g., less than 40 μm, less than 30 μm, less than 20 μm, less than 10 μm, less than 5 μm, less than 3 μm, less than 1 μm, less than 0.5 μm, less than 0.1 μm, less than 0.05 μm, less than 0.01 μm, less than 0.005 μm, or less.

Depending on the application, the overall thickness of the layered structure may range from 0.1 mm to 5 mm, e.g., from 0.1 mm to 4 mm, from 0.1 mm to 3 mm, from 0.1 mm to 2.5 mm, from 0.5 mm to 2 mm, or from 1 mm to 1.5 mm. In terms of upper limits, the overall thickness of the layered structure may be less than 5 mm, less than 4.5 mm, less than 4 mm, less than 3.5 mm, less than 3 mm, less than 2.5 mm, less than 2 mm, less than 1.5 mm, less than 1 mm, less than 0.5 mm, less than 0.3 mm, less than 0.2 mm, or less. In terms of lower limits, the overall thickness of the layered structure may be greater than 0.1 mm, e.g., greater than 0.5 mm, greater than 1 mm, greater than 1.5 mm, greater than 2 mm, greater than 3 mm, greater than 4 mm, greater than 4.5 mm, or greater.

Charging Terminal Electrical Property

Depending on the thickness of the contact layer and/or the thickness of the substrate and the design of the charging terminal, the charging terminal produced using the layered structure may demonstrate a conductivity ranging from $4.64 \times 10^7$ S/m to $5.8 \times 10^7$ S/m, e.g., from $4.7 \times 10^7$ S/m to $5.8 \times 10^7$, from $4.8 \times 10^7$ S/m to $5.8 \times 10^7$, from $4.9 \times 10^7$ S/m to $5.8 \times 10^7$, from $5.0 \times 10^7$ S/m to $5.8 \times 10^7$, from $5.1 \times 10^7$ S/m to $5.8 \times 10^7$, from $5.2 \times 10^7$ S/m to $5.8 \times 10^7$, from $5.3 \times 10^7$ S/m to $5.8 \times 10^7$, from $5.4 \times 10^7$ S/m to $5.8 \times 10^7$, from $5.5 \times 10^7$ S/m to $5.8 \times 10^7$, from $5.6 \times 10^7$ S/m to $5.8 \times 10^7$, or from $5.7 \times 10^7$ S/m to $5.8 \times 10^7$. In terms of lower limits, the conductivity of the charging terminal may be greater than $4.64 \times 10^7$ S/m, e.g., greater than $4.7 \times 10^7$ S/m, greater than $4.8 \times 10^7$ S/m, greater than $4.9 \times 10^7$ S/m, greater than $5.0 \times 10^7$ S/m, greater than $5.1 \times 10^7$ S/m, greater than $5.2 \times 10^7$ S/m, greater than $5.3 \times 10^7$ S/m, greater than $5.4 \times 10^7$ S/m, greater than $5.5 \times 10^7$ S/m, greater than $5.6 \times 10^7$ S/m, greater than $5.7 \times 10^7$ S/m, greater than $5.75 \times 10^7$ S/m, or greater. The conductivity ranges mentioned above are also applicable to the charging terminal produced using the layered structure.

Exemplary Layered Structures

FIG. 1 schematically illustrates a layered structure 100 that may be used to form or produce a charging terminal or charging contact. The layered structure 100 may include a substrate 102 and a contact layer 104 disposed over the substrate 102. Although FIG. 1 illustrates that the contact layer 104 is disposed over the entire substrate 102, in some embodiments, the contact layer 104 may be disposed over a portion or portions of the substrate 102. The substrate 102 may be made of a (highly) conductive material, such as metal or metal alloy, more specifically, such as copper or copper alloy, for conducting current through the charging terminal. The substrate 102 may be configured to provide mechanical support for the contact layer 104 and/or to maintain the structural integrity of the charging terminal formed.

As described herein the contact layer 104 may include a precious-metal-based contact layer with rare earth metal addition(s). The addition of the rare earth metal may create surface characteristics that provide low electrical contact resistance, and/or good abrasion and/or wear performance, thereby improving the overall performance of the charging terminal produced. Furthermore, the addition of the rare earth metal may achieve low coefficient of friction for the contact layer 104, thereby achieving a low insertion force for the charging terminal and improve ease of operation for a user.

Figure 2:
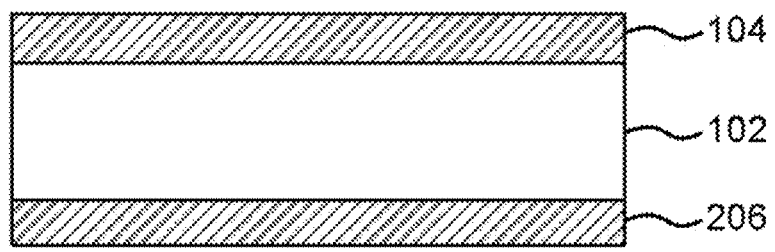
FIG. 2 schematically illustrates another embodiment of a layered structure that may be used to form or produce a charging terminal or charging contact.

FIG. 2 schematically illustrates another layered structure 200 that may be used to form or produce a charging terminal or charging contact. The layered structure 200 differs from the layered structure 100 in that the layered structure 200 may further include a second or lower contact layer 206 disposed under the substrate 102. The contact layer 206 may include a material composition the same as or similar to the material composition of the contact layer 102. Thus, the layered structure 200 may be used to form a charging terminal that include two electrical contact surfaces, one formed by the contact layer 102 and the other formed by the contact layer 206, both of which may demonstrate low friction, low contact resistance, and/or high wear/erosion resistance. Although FIG. 2 illustrates that the contact layer 206 is disposed cross the entire lower surface of the substrate 102, in some embodiments, the contact layer 206 may be disposed over a portion or portions of the lower surface of the substrate 102.

Figure 3:
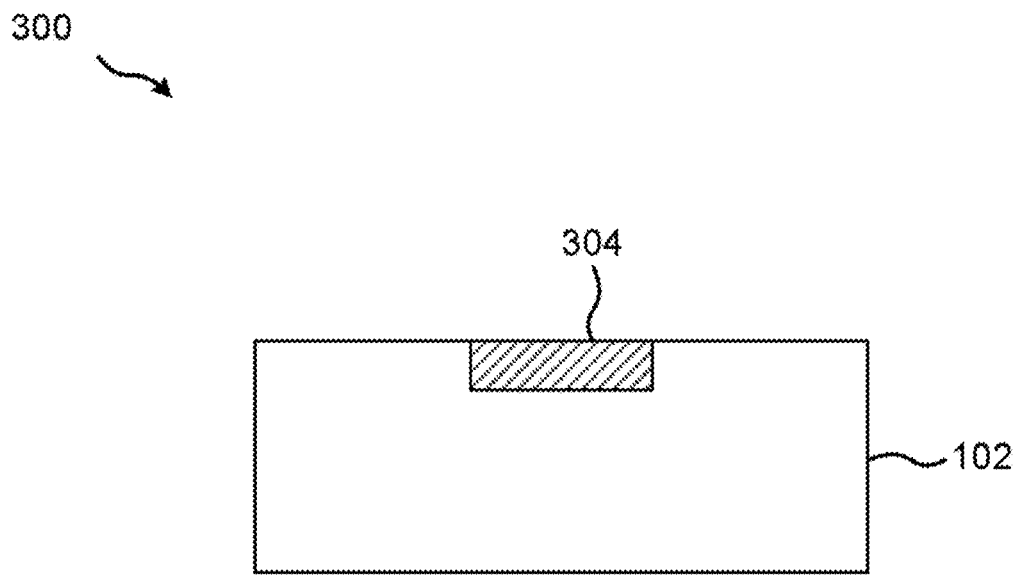
FIG. 3 schematically illustrates another embodiment of a layered structure that may be used to form or produce a charging terminal or charging contact.

FIG. 3 schematically illustrates another layered structure 300 that may be used to form or produce a charging terminal or charging contact. The layered structure 300 differs from the layered structure 100 in that the layered structure 300 may include a precious-metal-based contact layer 304 with rare-earth-metal addition(s) that is inlaid or embedded in the substrate 102. The surface of the precious-metal-based contact layer 304 may be flush with the surface of the substrate 102. Thus, the precious-metal-based contact layer 304 may also be referred to as the precious-metal-based inlay 304. Although FIG. 3 illustrates that the precious-metal-based contact layer or inlay 304 is disposed at or near a central region of the surface of the substrate 102, in some embodiments, the precious-metal-based contact layer or inlay 304 may be off-centered with respect to the substrate 102, may be disposed at or near an edge of the substrate 102, or may be disposed at any suitable location depending the design of the charging terminal to be produced from the layered structure 300.

Figure 4:
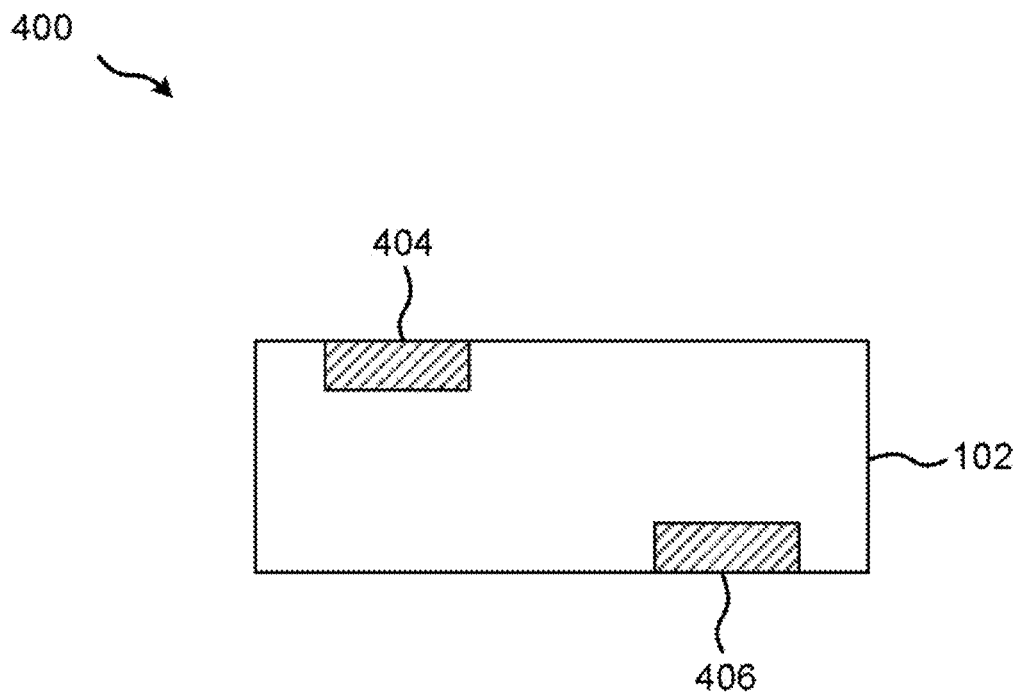
FIG. 4 schematically illustrates another embodiment of a layered structure that may be used to form or produce a charging terminal or charging contact.

FIG. 4 schematically illustrates another layered structure 400 that may be used to form or produce a charging terminal or charging contact. The layered structure 400 may include a first precious-metal-based contact layer 404 with rare-earth-metal addition(s) that is inlaid or embedded in a first surface of the substrate 102. The surface of the first precious-metal-based contact layer 404 may be flush with the first surface of the substrate 102. The layered structure 400 may further include a second precious-metal-based contact layer 406 with rare-earth-metal addition(s) that is inlaid or embedded in a second surface of the substrate 102 opposite to the first surface of the substrate 102. The surface of the second precious-metal-based contact layer 404 may be flush with the second surface of the substrate 102. Thus, the first and second precious-metal-based contact layers 404, 406 may also be referred to as the first and second precious-metalbased inlays 404, 406, respectively. In some embodiments, the first precious-metal-based contact layer or inlay 404 and the second precious-metal-based contact layer or inlay 406 are offset from each other, such as shown in FIG. 4. In some embodiments, the first and second precious-metal-based contact layers or inlays 404, 406 may overlap or may be aligned with each other, depending on the design of the charging terminal to be produced.

Figure 5:
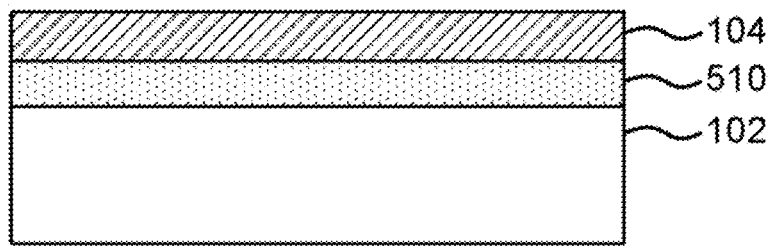
FIG. 5 schematically illustrates another embodiment of a layered structure that may be used to form or produce a charging terminal or charging contact.

FIG. 5 schematically illustrates another layered structure 500 that may be used to form or produce a charging terminal or charging contact. The layered structure 500 differs from the layered structure 100 in that the layered structure 500 may further include a diffusion barrier 510 disposed between the substrate 102 and the precious-metal-based contact layer 104. The diffusion barrier 510 may prevent atoms from the substrate, such as a copper substrate, from migrating from the substrate 102 to the precious-metal-based contact layer 104, such as a silver-and-samarium-containing contact layer, at elevated temperature. In some embodiments, a diffusion barrier may also be disposed between any of the inlays and the substrate, such as between any of the inlays 304, 404, 406 and the substrate 102. The diffusion barrier 510 may include nickel, niobium, or other suitable materials, or combinations thereof.

In some embodiments, the diffusion barrier 510 may have a thickness ranging from 0.01 mm to 0.05 mm, e.g., from 0.01 mm to 0.04 mm, from 0.01 mm to 0.03 mm, from 0.01 mm to 0.02 mm, from 0.02 mm to 0.05 mm, from 0.02 mm to 0.04 mm, from 0.02 mm to 0.03 mm, from 0.03 mm to 0.05 mm, from 0.03 mm to 0.04 mm, or from 0.04 mm to 0.05 mm. In terms of lower limits, the thickness of the diffusion barrier 510 may be greater than 0.01 mm, e.g., greater than 0.02 mm, greater than 0.03 mm, greater than 0.04 mm, greater than 0.045 mm, or greater. In terms of upper limits, the thickness of the diffusion barrier 510 may be less than 0.05 mm, e.g., less than 0.04 mm, less than 0.03 mm, less than 0.02 mm, less than 0.015 mm, or less.

Figure 6:
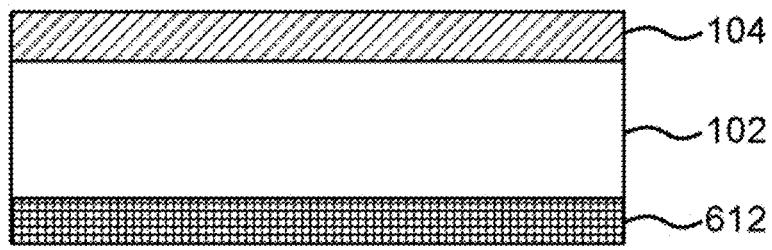
FIG. 6 schematically illustrates another embodiment of a layered structure that may be used to form or produce a charging terminal or charging contact.

FIG. 6 schematically illustrates another layered structure 600 that may be used to form or produce a charging terminal or charging contact. The layered structure 600 differs from the layered structure 100 in that the layered structure 600 may further include a stiffening layer 612 disposed over the surface of the substrate 102 opposite to the surface of the substrate 102 over which the contact layer 104 is disposed. The stiffening layer 612 may provide mechanical support or stiffness for the layered structure 500, which may in turn improve the robustness of the charging terminal produced and allow the charging terminal to maintain its structural integrity during its operating life. In some embodiments, the layered structure 300 shown in FIG. 3 and the layered structure 500 shown in FIG. 5 may also include a stiffening layer similar to the stiffening layer 612 shown in FIG. 6. The stiffening layer 612 may include high strength alloy, such as high strength copper based alloy or iron based alloy. In some embodiments, the stiffening layer 612 may include steel.

In some embodiments, the stiffening layer 612 may have a thickness ranging from 0.1 mm to 1 mm, e.g., from 0.1 mm to 0.9 mm, from 0.1 mm to 0.8 mm, from 0.1 mm to 0.7 mm, from 0.1 mm to 0.6 mm, from 0.1 mm to 0.5 mm, from 0.1 mm to 0.4 mm, from 0.1 mm to 0.3 mm, from 0.1 mm to 0.2 mm, from 0.2 mm to 1 mm, from 0.2 mm to 0.9 mm, from 0.2 mm to 0.8 mm, from 0.2 mm to 0.7 mm, from 0.2 mm to 0.6 mm, from 0.2 mm to 0.5 mm, from 0.2 mm to 0.4 mm, from 0.2 mm to 0.3 mm, from 0.3 mm to 1 mm, from 0.3 mm to 0.9 mm, from 0.3 mm to 0.8 mm, from 0.3 mm to 0.7 mm, from 0.3 mm to 0.6 mm, from 0.3 mm to 0.5 mm, from 0.3 mm to 0.4 mm, from 0.4 mm to 1 mm, from 0.4 mm to 0.9 mm, from 0.4 mm to 0.8 mm, from 0.4 mm to 0.7 mm, from 0.4 mm to 0.6 mm, from 0.4 mm to 0.5 mm, from 0.5 mm to 1 mm, from 0.5 mm to 0.9 mm, from 0.5 mm to 0.8 mm, from 0.5 mm to 0.7 mm, from 0.5 mm to 0.6 mm, from 0.6 mm to 1 mm, from 0.6 mm to 0.9 mm, from 0.6 mm to 0.8 mm, from 0.6 mm to 0.7 mm, from 0.7 mm to 1 mm, from 0.7 mm to 0.9 mm, from 0.7 mm to 0.8 mm, from 0.8 mm to 1 mm, from 0.8 mm to 0.9 mm, or from 0.9 mm to 1 mm. In terms of lower limits, the thickness of the stiffening layer 612 may be greater than 0.1 mm, e.g., greater than 0.2 mm, greater than 0.3 mm, greater than 0.4 mm, greater than 0.5 mm, greater than 0.6 mm, greater than 0.7 mm, greater than 0.8 mm, greater than 0.9 mm, greater than 0.95 mm, or greater. In terms of upper limits, the thickness of the stiffening layer 612 may be less than 1 mm, e.g., less than 0.9 mm, less than 0.8 mm, less than 0.7 mm, less than 0.6 mm, less than 0.5 mm, less than 0.4 mm, less than 0.3 mm, less than 0.2 mm, less than 0.15 mm, or less.

Although flat geometries of various layered structures are shown in FIGS. 1-6, the layered structures are not limited to flat geometries. Depending on the application, round shapes, such as wire, rod, etc., or any other desired shapes, may be produced using the various processed described herein, such as cladding, co-extrusion, etc., as will be discussed in more detail below.

Process

The various layered structures described herein may be produced via cladding or any other suitable process. Cladding is a continuous metal joining process where two or more alloys are metallurgically bonded in, e.g., continuous coils. Cladding may include roll cladding, hot or warm cladding, co-extrusion, and the like.

In the case of rolling cladding, incoming materials are thoroughly cleaned prior to bonding in a specialized rolling mill. The layers are reduced by greater than 50%, e.g., greater than 60%, greater than 70%, greater than 80%, or greater than 90%, of their combined thickness to create new oxide free surfaces at the alloy interfaces. This high pressure bonding creates atom to atom contact between the layers. In some embodiments, a subsequent, secondary heat treatment may be utilized to drive diffusion and alloying between the cladded layers, which enhances the metallurgical bond between the alloys of adjacent layers.

In the case of hot or warm cladding, heat is used during the roll cladding process, allowing thermal diffusion of the layers in the initial bonding step to occur. Hot or warm cladding allows for lower percentage thickness reductions while achieving metallurgical bond between the alloys of adjacent layers without requiring a secondary heat treatment.

In the case of co-extrusion, round or cylindrical shapes are drawn or extruded through a die to impart a large reduction in cross sectional area of the material. As in roll cladding, this linear expansion creates new surface contacts under great pressure. This also accomplishes the atom to atom contact between layers that enables diffusion and metallurgical bonding of adjacent alloys. Geometries other than flat strip are possible via co-extrusion.

Figure 7:
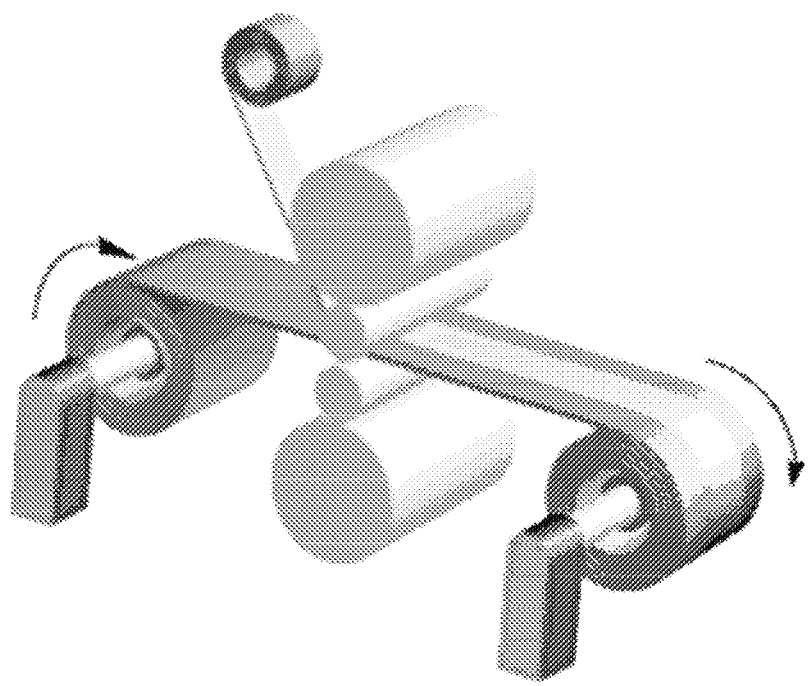
FIG. 7 schematically illustrates an embodiment of a cladding process.

FIG. 7 schematically illustrates an embodiment of a cladding process. Specifically, FIG. 7 schematically illustrates a selective cladding process. As shown, the two layers of materials, such as two layers of different alloys, may have different widths. The narrower layer may be inlaid into the wider layer via cladding. The selective cladding process may be used to produce, e.g., the layered structure 300 and/or the layered structure 400 described above.

Figure 8A:
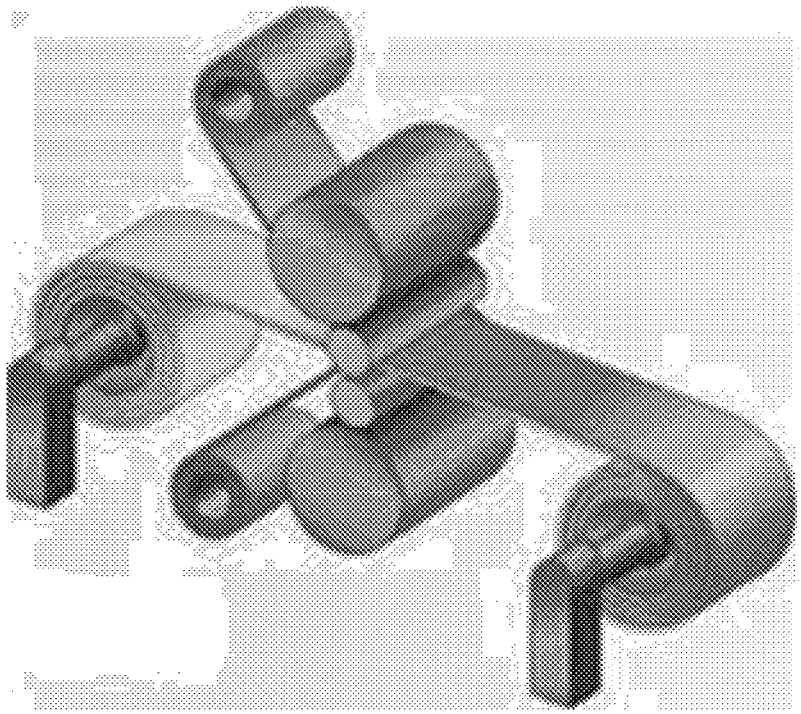
FIG. 8A schematically illustrates another embodiment of a cladding process.

FIG. 8A schematically illustrates another embodiment of a cladding process. Specifically, FIG. 8A illustrates a full coverage cladding process. The full coverage cladding may be used to bond a full width contact layer, such as the contact layer 104 described above, to a substrate and to bond a stiffening layer, such as the stiffening layer 612 described above, to the substrate.

Figure 8B:
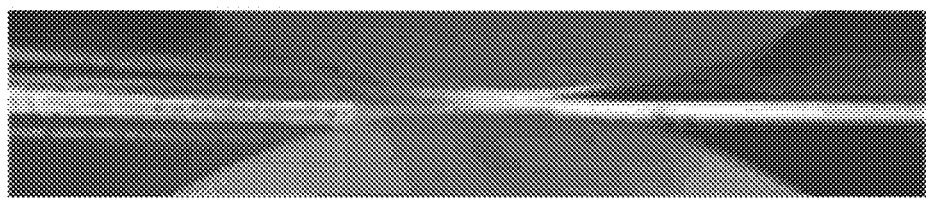
FIG. 8B schematically illustrates further detail of an embodiment of a cladding process.

FIG. 8B schematically illustrates further detail of an embodiment of a cladding process. Specifically, FIG. 8B illustrates three layers of materials entering from one side of the rotating rolls, which are configured to reduce the combined thickness of the three layers by approximately 60%, or any other desired percentage reduction. As shown, the structure exiting the rotating rolls has a significantly reduced thickness with the three layers in intimate contact. The newly created contact area at the interface breaks apart oxide boundaries and creates atom to atom contact between layers.

Cladding offers several advantages that may not be achieved by conventional coating processes, such as electroplating. For example, electroplating can only be used to form a pure metal coating. In other words, electroplating cannot be used to form an alloy contact layer, such as the contact layer described herein with rare-earth-metal addition(s). Additionally, cladding allows for several geometry and design options, such as the diffusion barrier and/or the backing layer, that improve the overall performance of the various layered structures and the charging terminals produced therefrom. Furthermore, cladding can optimize the surface benefits provided by the precious-metal-based contact layers or inlays by applying the contact layers or inlays at select locations on the substrate to create a composite structure that demonstrates high overall conductivity, physical strength, and stiffness.

Exemplary Charging Terminal

Figure 9A:
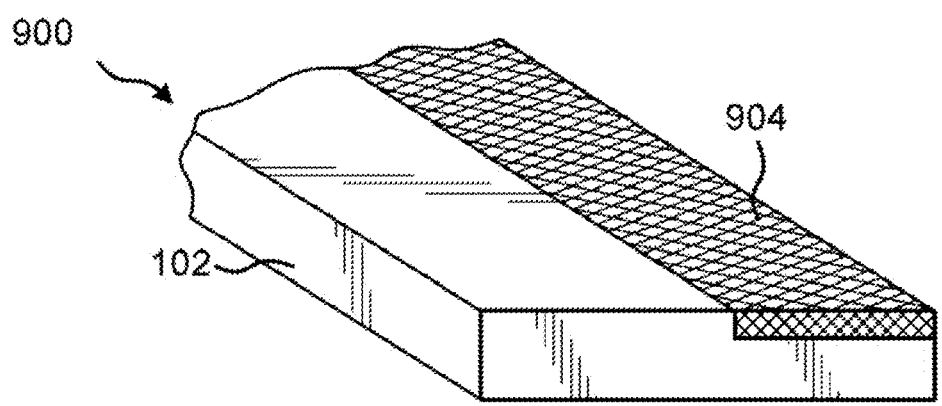
FIG. 9A schematically illustrates another embodiment of a layered structure that may be used to form or produce a charging terminal or charging contact.
Figure 9B:
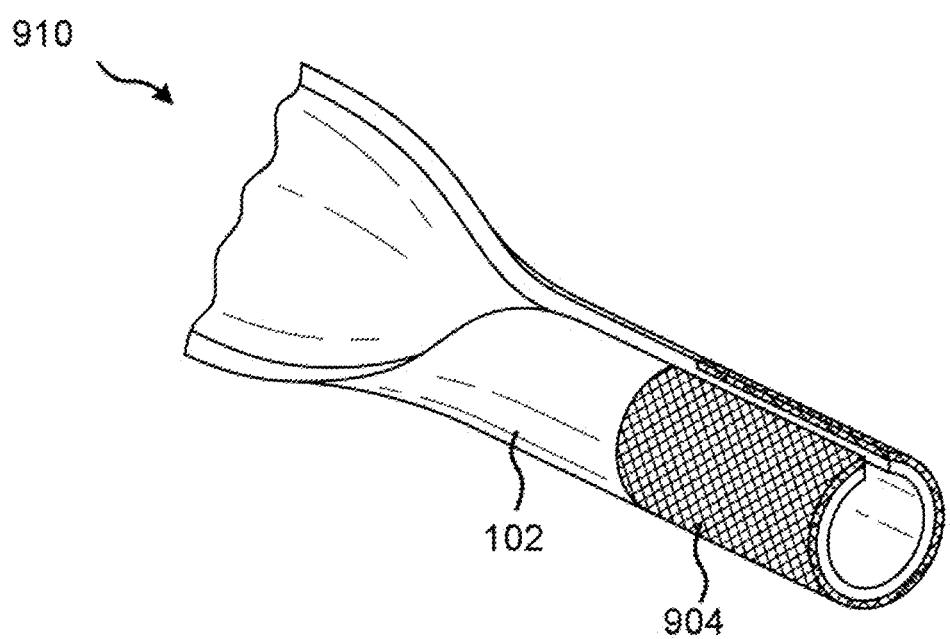
FIG. 9B schematically illustrates an embodiment of a plug end of a charging terminal produced using the layered structure shown in FIG. 9A.
Figure 9C:
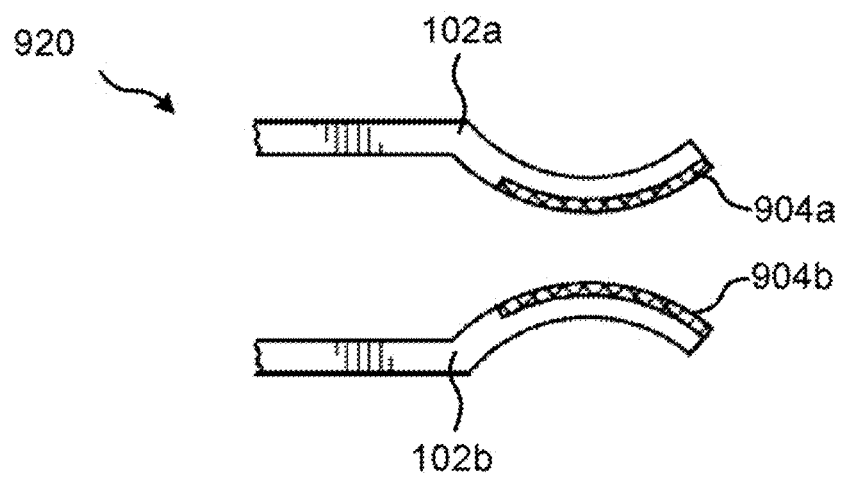
FIG. 9C schematically illustrates an embodiment of a receptacle end of a charging terminal produced using the layered structure shown in FIG. 9A.

FIG. 9A schematically illustrates another layered structure 900 that may be used to form or produce a charging terminal or charging contact. The layered structure 900 is similar to the layered structure 300 shown in FIG. 3 except that the precious-metal-based contact layer or inlay 904 is disposed at an edge of the substrate 102. FIG. 9B schematically illustrates a plug end 910 of a charging terminal produced using the layered structure 900, and FIG. 9C schematically illustrates a receptacle end 920 of the charging terminal produced using the layered structure 900.

During operation, the head or cylindrical end of the plug end 910 is inserted into the receptacle end 920. The tail or flat end of the plug end 910 may be attached to wire or cable that couples the plug end 910 to a battery, such as a battery used in an electric vehicle. The flat end of the receptacle end 920 may be attached to an wire or cable that couples the receptacle end 920 to a power source for charging the battery. During insertion, the outer surface of the plug end 910, which is defined at least in part by the precious-metal-based contact layer or inlay 904, is pushed to slide along and between two convex surfaces of the receptacle end 920, which are defined at least in part by the precious-metal-based contact layers or inlays 904a, 904b.

As discussed above, the oxide that may be formed from the rare earth metal contained in the contact layer or inlay alloy may reduce the coefficient of friction, thereby lowering the insertion force for the user to push the plug end 910 into the receptacle end 920, as well as the extraction force for the user to pull the plug end 910 out of the receptacle end 920. Depending on the design of the plug end 910 and the receptacle end 920 of the charging terminal, the insertion force and/or extraction force may range from 0.1 lb to 3.0 lb, e.g., from 0.1 lb to 2.5 lb, from 0.1 lb to 2.0 lb, from 0.1 lb to 1.5 lb, from 0.1 lb to 1.0 lb, from 0.1 lb to 0.75 lb, from 0.1 lb to 0.5 lb, from 0.1 lb to 0.25 lb, from 0.25 lb to 3.0 lb, from 0.25 lb to 2.5 lb, from 0.25 lb to 2.0 lb, from 0.25 lb to 1.5 lb, from 0.25 lb to 1.0 lb, from 0.25 lb to 0.75 lb, from 0.25 lb to 0.5 lb, from 0.5 lb to 3.0 lb, from 0.5 lb to 2.5 lb, from 0.5 lb to 2.0 b, from 0.5 lb to 1.5 lb, from 0.5 lb to 1.0 lb, from 0.5 lb to 0.75 lb, from 0.75 lb to 3.0 lb, from 0.75 lb to 2.5 lb, from 0.75 lb to 2.0 lb, from 0.75 lb to 1.5 lb, from 0.75 lb to 1.0 lb, from 1.0 lb to 3.0 lb, from 1.0 lb to 2.5 lb, from 1.0 lb to 2.0 lb, from 1.0 lb to 1.5 lb, from 1.5 lb to 3.0 lb, from 1.5 lb to 2.5 lb, from 1.5 lb to 2.0 lb, from 2.0 lb to 3.0 lb, from 2.0 lb to 2.5 lb, or from 2.5 lb to 3.0 lb. In terms of the upper limits, the insertion force and/or extraction force may be less than 3.0 lb, e.g., less than 2.5 lb, less than 2.0 lb, less than 1.5 lb, less than 1.0 lb, less than 0.75 lb, less than 0.5 lb, less than 0.25 lb, less than 0.2 lb, less than 0.15 lb, or less than. Given the reduced coefficient of friction and/or the insertion and extraction forces, the charging terminal may operate greater than 5,000 insertion and extraction cycles, e.g., greater than 6,000 insertion cycles, greater than 7,000 cycles, greater than 8,000 cycles, greater than 9,000 cycles, greater than 10,000 cycles, without incurring significant loss of electrical performance, e.g., loss of efficient electrical contact (low contact resistance) due to excessive wear at the connecting surfaces. For example, throughout its operating life, the increase in the contact resistance of the contact layer due to wear may be less than 30%, less than 20%, less than 15%, less than 10%, less than 5%, less than 3%, less than 2%, less than 1%, or less, as compared to the initial contact resistance when the charging terminal is first put into service.

Although charging terminals for electric vehicles are described as examples, the various layered structures described herein can be used for producing charging terminals for other applications, such as other high power applications, where one or more of high wear performance, good electrical conductivity, low insertion force, etc., may be desired.

Examples

The following non-limiting examples are provided.

A precious metal/rare earth metal alloy (silver-samarium) comprising silver, copper, nickel, and zinc, along with samarium additive was provided. A comparative alloy comprising the same metals, but not including the samarium additive was provided as well. The compositional amounts of the components are shown in Table 1.

TABLE 1

| Alloy Composition | | |
| --- | --- | --- |
| Component | Ex. 1 Wt % | Comp. Ex. A wt % |
| Silver | balance | balance |
| Copper | 4.0 | 4.0 |
| Nickel | 0.35 | 0.35 |
| Zinc | 0.3 | 0.3 |
| Samarium | 0.1 | — |

Layered structures comprising the copper substrate layer and a contact layer were formed via cladding operation. The copper substrate layer employed copper. The copper, standing alone, had a conductivity of ~100 IACS. The contact layer utilized the aforementioned Ag—Cu—Ni—Zn—Sm alloy (Ex. 1) and Ag—Cu—Ni—Zn alloy (Comp Ex. A). A commercial silver electroplated copper strip was also included as Comp. Ex. B.

The layered structures were measured for hardness (ASTM E384-17); conductivity (ASTM B193-20); and Coefficient of Friction (ASTM G99-17). The results are shown in Table 2.

TABLE 2

Layered Structure Performance

| Ex./Comp. Ex. | Hardness (HV) | Conductivity, % IACS | CoF (dry) |
|---|---|---|---|
| Ex. 1 | 100-120 | 87% | 0.2 |
| Comp. Ex. A | 100-120 | 87% | 1.0 |
| Comp. Ex. B | 40-185 | ~100% | 1.4 |

As shown in Table 2, Ex. 1 provided for suitable hardness and conductivity, and also demonstrated a significant coefficient of friction performance improvement over Comp. Exs. A and B—an 80% improvement over Comp. Ex. A and am 86% improvement over Comp. Ex. B. Surprisingly, the layered structure of Ex. 1 provided for these coefficient of friction improvements without sacrificing conductivity performance versus Comp. Ex. A (and only a minimal conductivity drop-off versus Comp. Ex. B).

It is estimated based on simulation estimates that if the layered structures were tested for over 5,000 insertion/extraction, the layered structures would have an increase in contact resistance due to wear of less than 30%, as compared to the initial contact resistance when the charging terminal is first put into service.

Also, under the same testing conditions, it is estimated based on simulation estimates that the insertion force would be reduced by a factor of 7 (or less), as compared to the same connector design employing a silver plated structure without the Sm, e.g., Comp. Ex. B.

EMBODIMENTS

The following embodiments are contemplated. All combinations of features and embodiments are contemplated.

Embodiment 1: a layered structure, comprising: a substrate having a conductivity greater than 40% IACS ($2.3200 \times 10^7$ S/m), e.g., greater than 60% IACS (or greater than $3.4801 \times 10^7$ S/m); and a contact layer disposed over at least a portion of the substrate, wherein the contact layer demonstrates a coefficient of friction of less than 1.4, as measured in accordance with American Society Testing and Materials (ASTM) G99-17.

Embodiment 2: the embodiment of any of the preceding embodiments, wherein the contact layer comprises a rare earth metal.

Embodiment 3: the embodiment of any of the preceding embodiments, wherein the contact layer comprises samarium.

Embodiment 4: the embodiment of any of the preceding embodiments, wherein the contact layer comprises a precious-metal-based alloy.

Embodiment 5: the embodiment of any of the preceding embodiments, wherein the contact layer comprises a silver alloy.

Embodiment 6: the embodiment of any of the preceding embodiments, wherein the contact layer comprises a samarium-silver alloy.

Embodiment 7: the embodiment of any of the preceding embodiments, wherein the contact layer comprises a samarium oxide.

Embodiment 8: the embodiment of any of the preceding embodiments, wherein the contact layer comprises less than 0.1 wt % samarium oxide.

Embodiment 9: the embodiment of any of the preceding embodiments, wherein the contact layer comprises less than 0.2 vol % samarium oxide.

Embodiment 10: the embodiment of any of the preceding embodiments, wherein the contact layer comprises a samarium oxide that is distributed across a depth of the contact layer ranging from 0.001 μm to 50 μm, as measured from the surface of the contact layer.

Embodiment 11: the embodiment of any of the preceding embodiments, wherein the contact layer comprises copper, nickel, or zinc, or combinations thereof.

Embodiment 12: the embodiment of any of the preceding embodiments, wherein the contact layer comprises: from 0.001 wt % to 10 wt % samarium; and/or from 50 wt % to 99.9 wt % silver.

Embodiment 13: the embodiment of any of the preceding embodiments, wherein the contact layer comprises: from 0.001 wt % to 10 wt % samarium; and/or balance silver.

Embodiment 14: the embodiment of any of the preceding embodiments, wherein the contact layer comprises: from 50 wt % to 99.9 wt % silver; from 0.1 wt % to 20 wt % nickel; from 1 wt % to 30 wt % copper; and from 0.001 wt % to 10 wt % zinc.

Embodiment 15: the embodiment of any of the preceding embodiments, wherein the substrate comprises a metal, preferably copper or copper alloy.

Embodiment 16: the embodiment of any of the preceding embodiments, wherein the contact layer demonstrates a coefficient of friction ranging from 0.1 to 1.4.

Embodiment 17: the embodiment of any of the preceding embodiments, wherein the contact layer demonstrates a conductivity greater than 80% IACS (or greater than $4.6401 \times 10^7$ S/m).

Embodiment 18: the embodiment of any of the preceding embodiments, wherein the contact layer demonstrates a conductivity greater than 86% IACS (or greater than $4.9881 \times 10^7$ S/m).

Embodiment 19: the embodiment of any of the preceding embodiments, wherein the contact layer demonstrates a hardness of greater than 80 HV, as measured by ASTM E384-17.

Embodiment 20: the embodiment of any of the preceding embodiments, wherein the contact layer demonstrates a hardness ranging from 25 HV to 100 HV.

Embodiment 21: the embodiment of any of the preceding embodiments, wherein the contact layer demonstrates a hardness ranging from 150 HV to 200 HV.

Embodiment 22: the embodiment of any of the preceding embodiments, wherein the substrate demonstrates a conductivity greater than 95% IACS (or greater than $5.5101 \times 10^7$ S/m).

Embodiment 23: the embodiment of any of the preceding embodiments, wherein the substrate demonstrates a yield strength less than 70 ksi, as measured by ASTM E8/E8M-16a.

Embodiment 24: the embodiment of any of the preceding embodiments, wherein the layered structure demonstrates a conductivity greater than 80% IACS (or greater than $4.6401 \times 10^7$ S/m).

Embodiment 25: the embodiment of any of the preceding embodiments, wherein the contact layer has a thickness ranging from 5 µm to 40 µm.

Embodiment 26: the embodiment of any of the preceding embodiments, wherein the layered structure has a thickness ranging from 0.1 mm to 5 mm.

Embodiment 27: the embodiment of any of the preceding embodiments, wherein the layered structure is formed by cladding the contact layer onto the substrate.

Embodiment 28: the embodiment of any of the preceding embodiments, wherein the layered structure further comprises a diffusion barrier disposed between the substrate and the contact layer.

Embodiment 29: the embodiment of any of the preceding embodiments, wherein the diffusion barrier comprises nickel or niobium.

Embodiment 30: the embodiment of any of the preceding embodiments, wherein the diffusion barrier has a thickness ranging from 0.01 mm to 0.05 mm.

Embodiment 31: the embodiment of any of the preceding embodiments, wherein the layered structure further comprises a backing layer disposed over at least a portion of the substrate opposite the contact layer.

Embodiment 32: the embodiment of any of the preceding embodiments, wherein the backing layer comprises a high strength copper based alloy or iron based alloy.

Embodiment 33: the embodiment of any of the preceding embodiments, wherein the backing layer comprises steel.

Embodiment 34: the embodiment of any of the preceding embodiments, wherein the backing layer has a thickness ranging from 0.1 mm to 1 mm.

Embodiment 35: the embodiment of any of the preceding embodiments, wherein the substrate and/or the contact layer are substantially flat.

Embodiment 36: the embodiment of any of the preceding embodiments, wherein the substrate is cylindrical, and the contact layer is disposed around at least a portion of the exterior surface of the cylindrical substrate.

Embodiment 37: the embodiment of any of the preceding embodiments, wherein the layered structure is configured for high power applications.

Embodiment 38: an electrical terminal or connector of any of the preceding embodiments, wherein the electrical terminal or connector is configured to perform at greater than 5,000 insertion and extraction cycles, e.g., greater than 10,000 insertion and extraction cycles, without failure.

Embodiment 39: the embodiment of any of the preceding embodiments, wherein when the electrical terminal or connector performs greater than 5,000 insertion and extraction cycles, e.g., greater than 10,000 insertion and extraction cycles, an increase in the contact resistance is less than 30%, less than 15%, less than 10%, less than 5%, less than 3%, less than 2%, or less than 1%.

Embodiment 40: a charging terminal, comprising: a substrate having a conductivity greater than 60% IACS (or greater than $3.4801 \times 10^7$ S/m); and a contact layer disposed over at least a portion of the substrate, wherein the charging terminal demonstrates a coefficient of friction ranging from 0.1 to 1.4, as measured in accordance with ASTM G99-17.

Embodiment 41: a contact layer composition, comprising: samarium; silver; nickel; copper; and/or zinc, wherein the contact layer composition demonstrates a coefficient of friction ranging from 0.1 to 1.4, as measured in accordance with ASTM G99-17.

Embodiment 42: the embodiment of any of the preceding embodiments, comprising: from 0.001 wt % to 10 wt % samarium; and/or from 50 wt % to 99.9 wt % silver.

Embodiment 43: the embodiment of any of the preceding embodiments, comprising: from 50 wt % to 99.9 wt % silver; from 0.1 wt % to 20 wt % nickel; from 1 wt % to 30 wt % copper; and from 0.001 wt % to 10 wt % zinc.

Embodiment 44: the embodiment of any of the preceding embodiments, wherein the contact layer demonstrates a conductivity of greater than 86% IACS (or greater than $4.9881 \times 10^7$ S/m).

Embodiment 45: the embodiment of any of the preceding embodiments, wherein samarium is a samarium oxide.

Embodiment 46: a process for preparing a layered structure of any of the preceding embodiments, comprising: providing the substrate; and forming the contact layer over the substrate.

Embodiment 47: the embodiment of any of the preceding process embodiments, wherein forming the contact layer over the substrate comprises forming an alloy comprising samarium metal over the substrate.

Embodiment 48: the embodiment of any of the preceding process embodiments, wherein forming the contact layer over the substrate further comprises oxidizing at least some of the samarium metal by exposing the contact layer to air.

Embodiment 49: the embodiment of any of the preceding process embodiments, further comprising: forming a diffusion barrier, optionally comprising nickel or niobium, between the substrate and the contact layer.

Embodiment 50: the embodiment of any of the preceding process embodiments, further comprising: forming a backing layer, optionally comprising a high strength copper or iron based alloy, between the substrate and the contact layer.

Embodiment 51: the embodiment of any of the preceding process embodiments, wherein any of the contact layer, the diffusion barrier, and/or the backing layer are achieved via cladding.

While the invention has been described in detail, modifications within the spirit and scope of the invention will be readily apparent to those of skill in the art. In view of the foregoing discussion, relevant knowledge in the art and references discussed above in connection with the Background and Detailed Description, the disclosures of which are all incorporated herein by reference. In addition, it should be understood that aspects of the invention and portions of various embodiments and various features recited below and/or in the appended claims may be combined or interchanged either in whole or in part. In the foregoing descriptions of the various embodiments, those embodiments which refer to another embodiment may be appropriately combined with other embodiments as will be appreciated by one of skill in the art. Furthermore, those of ordinary skill in the art will appreciate that the foregoing description is by way of example only, and is not intended to limit.

We claim:

1. A layered structure, comprising:
   a substrate having a conductivity greater than 40% International Annealed Copper Standard (IACS) (or greater than $2.3200 \times 10^7$ S/m); and
   a contact layer disposed over at least a portion of the substrate, wherein the contact layer comprises a samarium-silver alloy consisting of:
   less than 5 wt % copper; more than 0% and less than 0.5 wt % nickel; more than 0% and less than 0.5 wt % zinc; from 0.05 wt % to 0.5 wt % samarium; balance silver and additional precious metals, and one or more oxides thereof, wherein the one or more oxides includes samarium oxide present only at the surface of the contact layer; and wherein the contact layer demonstrates a coefficient of friction of less than 1.4, as measured in accordance with American Society for Testing and Materials (ASTM) G99-17.

2. The layered structure of claim 1, wherein the contact layer or the layered structure demonstrates a conductivity greater than 80% IACS (greater than $4.6401 \times 10^7$ S/m).

3. The layered structure of claim 1, wherein the contact layer demonstrates a hardness ranging from 100 HV to 120 HV.

4. The layered structure of claim 1, wherein the layered structure has a thickness ranging from 0.1 mm to 5 mm.

5. An electrical terminal or connector comprising the layered structure of claim 1, wherein the electrical terminal or connector is configured to perform greater than 5,000 insertion and extraction cycles, without failure.

6. The electrical terminal or connector of claim 5, wherein when the electrical terminal or connector performs at least 5,000 insertion and extraction cycles, an increase in the contact resistance is less than 30%.

7. A charging terminal, comprising:
a substrate having a conductivity greater than 40% IACS; and
a contact layer disposed over at least a portion of the substrate, wherein the contact layer comprises a samarium-silver alloy consisting of:
less than 5 wt % copper; more than 0% and less than 0.5 wt % nickel; more than 0% less than 0.5 wt % zinc; from 0.05 wt % to less than 0.5 wt % samarium; balance silver and additional precious metals, and one or more oxides, wherein the one or more oxides includes samarium oxide present only at the surface of the contact layer; and
wherein the charging terminal demonstrates a coefficient of friction ranging from 0.1 to 1.4, as measured in accordance with ASTM G99-17.

8. A contact layer composition consisting of:
less than 5 wt % copper; more than 0% and less than 0.5 wt % nickel; more than 0% and less than 0.5 wt % zinc; from 0.05 wt % to less than 0.5 wt % samarium; balance silver and additional precious metals; and one or more oxides thereof, wherein the one or more oxides includes samarium oxide present only at the surface of the contact layer; and
wherein the contact layer composition demonstrates a coefficient of friction ranging from 0.1 to 1.4, as measured in accordance with ASTM G99-17.

9. The layered structure of claim 1, wherein the samarium oxide present at the surface of the contact layer exists at a depth of 0.001 μm to 50 μm, as measured from the surface of the contact layer.

10. The layered structure of claim 1, wherein the one or more oxides includes samarium oxide and the contact layer comprises from 0.01 wt % to 0.1 wt % samarium oxide based on the total weight of the contact layer.

11. A process for preparing a layered structure, the process comprising:
providing a substrate; and
forming the contact layer over the substrate,
wherein the contact layer consists of: less than 5 wt % copper; more than 0% and less than 0.5 wt % nickel; more than 0% less than 0.5 wt % zinc; from 0.05 wt % to less than 0.5 wt % samarium; balance silver and additional precious metals; and one or more oxides thereof, wherein the one or more oxides includes samarium oxide present only at the surface of the contact layer; and
wherein the contact layer composition demonstrates a coefficient of friction ranging from 0.1 to 1.4, as measured in accordance with ASTM G99-17.

12. The process of claim 11, wherein forming comprises oxidizing at least some of the samarium metat by exposing the contact layer to air to form samarium oxide.

13. The process of claim 11, further comprising:
forming a diffusion barrier comprising nickel between the substrate and the contact layer; and/or
forming a backing layer comprising a high strength copper or iron based alloy between the substrate and the contact layer,
wherein the forming of any of the contact layer, the diffusion barrier, and the backing layer are optionally achieved via cladding.

* * * * *